United States Patent
Li

(10) Patent No.: US 12,510,703 B2
(45) Date of Patent: Dec. 30, 2025

(54) LIGHT COUPLING DEVICE FOR COUPLING LIGHT INTO A DISPLAY PANEL

(71) Applicant: CORNING INCORPORATED, Corning, NY (US)

(72) Inventor: Shenping Li, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/851,417

(22) PCT Filed: Apr. 19, 2023

(86) PCT No.: PCT/US2023/019078
§ 371 (c)(1),
(2) Date: Sep. 26, 2024

(87) PCT Pub. No.: WO2023/211734
PCT Pub. Date: Nov. 2, 2023

(65) Prior Publication Data
US 2025/0216593 A1    Jul. 3, 2025

Related U.S. Application Data

(60) Provisional application No. 63/336,580, filed on Apr. 29, 2022.

(51) Int. Cl.
*F21V 8/00* (2006.01)
*G02F 1/1333* (2006.01)
*G02F 1/1335* (2006.01)
*G02F 1/13357* (2006.01)

(52) U.S. Cl.
CPC .......... *G02B 6/0036* (2013.01); *G02B 6/0091* (2013.01); *G02F 1/133342* (2021.01); *G02F 1/133615* (2013.01); *G02F 1/133616* (2021.01)

(58) Field of Classification Search
CPC .. G02B 6/0036; G02B 6/0091; G02B 6/0061; G02B 6/0063; G02F 1/133342; G02F 1/133615; G02F 1/133616
See application file for complete search history.

(56) References Cited

U.S. PATENT DOCUMENTS

| | | |
|---|---|---|
| 8,836,889 B2 | 9/2014 | Park et al. |
| 9,121,978 B2 * | 9/2015 | Huang ............... G02B 6/0035 |
| 10,120,238 B2 | 11/2018 | Yata et al. |
| 10,429,694 B2 | 10/2019 | Yata et al. |
| 10,657,908 B2 | 5/2020 | Yata |

(Continued)

OTHER PUBLICATIONS

International Search Report and Written Opinion of the International Searching Authority; PCT/US2023/019078; dated Jun. 30, 2023; 10 pages; European Patent Office.

(Continued)

*Primary Examiner* — Keith G. Delahoussaye
(74) *Attorney, Agent, or Firm* — Kevin M. Able; F. Brock Riggs

(57) ABSTRACT

A light coupling device for use in a display device, the light coupling device including a transparent plate having a plurality of bridge structures configured to direct light from a light source arranged adjacent an edge surface of the transparent plate into a display panel attached to the transparent plate.

20 Claims, 12 Drawing Sheets

(56) References Cited

U.S. PATENT DOCUMENTS

| | | |
|---|---|---|
| 11,022,832 B2 | 6/2021 | Numata et al. |
| 2003/0206408 A1 | 11/2003 | Funamoto et al. |
| 2004/0062031 A1* | 4/2004 | Pinter ................... G02B 6/0095 362/330 |
| 2014/0375897 A1* | 12/2014 | Sugiura ................ G02B 6/0068 348/739 |
| 2017/0003439 A1* | 1/2017 | Lee ....................... G02B 6/0061 |
| 2017/0192152 A1 | 7/2017 | Choi et al. |
| 2019/0033507 A1 | 1/2019 | Wang et al. |
| 2020/0073044 A1* | 3/2020 | Wang ................... G02B 6/0055 |
| 2020/0326566 A1 | 10/2020 | Wei |
| 2021/0047235 A1 | 2/2021 | Kanungo et al. |
| 2021/0302747 A1 | 9/2021 | Wakayama et al. |
| 2021/0311243 A1 | 10/2021 | Numata et al. |

OTHER PUBLICATIONS

Numata et al., "Highly Transparent LCD using New Scattering-type Liquid Crystal with Field Sequential Color Edge Light", SID Symposium Digest of Technical Papers, vol. 48, No. 1, 2017, pp. 1166-1169.

Okuyama et al., "Highly Transparent LCD by Scattering Mode with Direct Edge Light and Field-Sequential Color-Driving Method", SID Symposium Digest of Technical Papers, vol. 52, No. 1, 2021, pp. 519-522.

\* cited by examiner

LIGHT COUPLING DEVICE FOR COUPLING LIGHT INTO A DISPLAY PANEL

CROSS REFERENCE TO RELATED APPLICATION

This application claims the benefit of priority under 35 U.S.C. § 119 of U.S. Provisional Application Ser. No. 63/336,580 filed on Apr. 29, 2022, the content of which is relied upon and incorporated herein by reference in its entirety.

FIELD

The present disclosure relates to a light coupling device for illuminating a display panel, and in particular, a transparent plate comprising a plurality of bridge structures configured to couple light from one or more light sources from the transparent plate to an adjacent display panel.

BACKGROUND

Liquid crystal display (LCD) devices (e.g., televisions, computer monitors, etc.) are used in a multitude of optical devices, large and small. Several categories of LCD display devices may be available. In one category, the display device includes a display panel and a backlight unit that illuminates the display panel. The display panel comprises a liquid crystal material, and other layers (various electrodes, color filters, etc.) disposed between two glass substrates. The backlight unit comprises a light guide plate and a light source. Light from the light source is coupled into the light guide plate, for example an edge surface of the light guide plate, extracted from the light guide plate, and redirected toward the display panel. By changing a property of the liquid crystal material, light from the backlight can be modulated to form an image emitted from the display panel. The image is viewable from a single side of the display panel.

A second category includes display devices wherein the image is viewable from both sides of the display device (two-side-view transparent display devices). Such display devices may be referred to as transparent display devices. In transparent display devices, the liquid crystal material may be sandwiched between two transparent plates, the liquid crystal layer functioning as a light guide, without the need for a separate backlight unit. By locally changing the light scattering properties of the liquid crystal material at the pixel location, light confined in the light guide plate by total internal reflection can be extracted from the light guide plate to form an image. This transparent liquid crystal display device can have high transparence, does not require special light sources (such as a polarized light source and/or a collimated light source), and provide two-side-view of the displayed image. However, because the liquid crystal material functions as the part of light guide plate this kind of display can suffer from poor display brightness uniformity and limited display size.

SUMMARY

Disclosed herein are display devices that may exhibit increased brightness uniformity, which may facilitate an increase in display size, while offering a two-sided view of an image. More particularly, the display device includes at least one transparent plate, for example a transparent glass plate, having a plurality of bridge structures extending therefrom and configured to be attached to a display panel, for example by an adhesive. The bridge structures are protrusions, e.g., columnar structures that are monolithic with the transparent plate (e.g., formed of the transparent plate material) or a material deposited on the transparent plate, for example an optically clear adhesive. The protrusions may have a regular, e.g., geometric, cross-sectional shape in a plane orthogonal to a longitudinal axis of the protrusion (and orthogonal to a first major surface of the transparent plate), such as a circular cross-sectional shape, an elliptical cross-sectional shape, or a polygonal cross-sectional shape. The bridge structures may be discrete bridge structures, e.g., discrete features, for example individual drops of a material separate from the material of the transparent plate. Such discrete features may be formed from a polymer material or be drops of optically clear adhesive. In other embodiments, the bridge structures may be the remainders of material removal or displacement from a surface of the transparent substrate itself. In still other embodiments, the bridge structures may comprise protrusions from a layer coated on the transparent plate and connecting the bridge structures together, for example a layer of optically clear adhesive. The transparent plate with bridge structures may be used to couple light from a light source into the display panel, thereby illuminating the display panel.

Accordingly, in a first aspect, a light coupling device for coupling light from a light source to a display panel is disclosed, the light coupling device comprising a transparent plate including a first major surface and a second major surface opposite the first major surface, the transparent plate further comprising a plurality of edge surfaces connecting the first major surface and the second major surface. A plurality of bridge structures extend from the second major surface of the transparent plate, each bridge structure having a length L defined between a reference surface from which the plurality of bridge structures extend and a distal end of the bridge structure farthest from the reference surface, the length L in a range from about 2 micrometers to about 200 micrometers.

In a second aspect, the plurality of edge surfaces comprises a first edge surface and a second edge surface opposite the first edge surface, for example parallel to the first edge surface, and the plurality of bridge structures comprises a first set of bridge structures positioned along a first axis extending between the first edge surface and the second edge surface, and a distance separating adjacent bridge structures of the first set of bridge structures along the first axis may decrease in a direction from the first edge surface toward the second edge surface.

In a third aspect, the plurality of bridge structures of the second aspect comprises a second set of bridge structures positioned along the first axis, and a distance separating adjacent bridge structures of the second set of bridge structures may decrease in a direction from the second edge surface toward the first edge surface In a fourth aspect, the plurality of edge surfaces of the third aspect comprises a third edge surface and a fourth edge surface opposite the third edge surface, for example parallel to the third edge surface, and the plurality of bridge structures comprises a third set of bridge structures positioned along a second axis extending between the third edge surface and the fourth edge surface, and a distance separating adjacent bridge structures of the third set of bridge structures may decrease in a direction from the third edge surface toward the fourth edge surface.

In a fifth aspect, the plurality of bridge structures of the fourth aspect comprises a fourth set of bridge structures positioned along the second axis, and a distance separating adjacent bridge structures of the fourth set of bridge structures decreases in a direction from the fourth edge surface toward the third edge surface.

In a sixth aspect, the first edge surface may be orthogonal to the third edge surface.

In a seventh aspect, a cross-sectional shape of a bridge structure of the plurality of bridge structures in a plane parallel with the first major surface may comprise a circle, an ellipse, or a polygon.

In a seventh aspect, a maximum width of each bridge structure in a plane parallel with the first major surface may be in a range from about 10 micrometers to about 50 millimeters.

In a ninth aspect, the maximum width may vary along the length of each bridge structure.

In a tenth aspect, the maximum width of each bridge structure may be greater at the distal end than at the reference surface.

In an eleventh aspect, the plurality of bridge structures may comprise an optically clear adhesive.

In a twelfth aspect, the optically clear adhesive may comprise a coating layer disposed on the second major surface of the transparent plate.

In a thirteenth aspect, the reference surface may be the second major surface of the transparent plate.

In a fourteenth aspect, the reference surface may be a surface of the transparent plate recessed from the second major surface.

In a fifteenth aspect, the reference surface of the twelfth aspect may comprise a recessed surface of the coating layer.

In a sixteenth aspect, a maximum thickness of the transparent plate may be in a range from about 0.1 mm to about 5 mm.

In a seventeenth aspect, a refractive index of the transparent plate may be in a range from about 1.35 to about 1.65.

In an eighteenth aspect, the transparent plate may be attached to a glass substrate joined to the plurality of bridge structures.

In a nineteenth aspect, the plurality of bridge structures may be disposed in a matrix material and wherein a refractive index of the matrix material may be at least about 10% less than a refractive index of the bridge structures.

In a twentieth aspect, a refractive index of the bridge structures may be no more than about 10% different than a refractive index of the transparent plate.

Both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
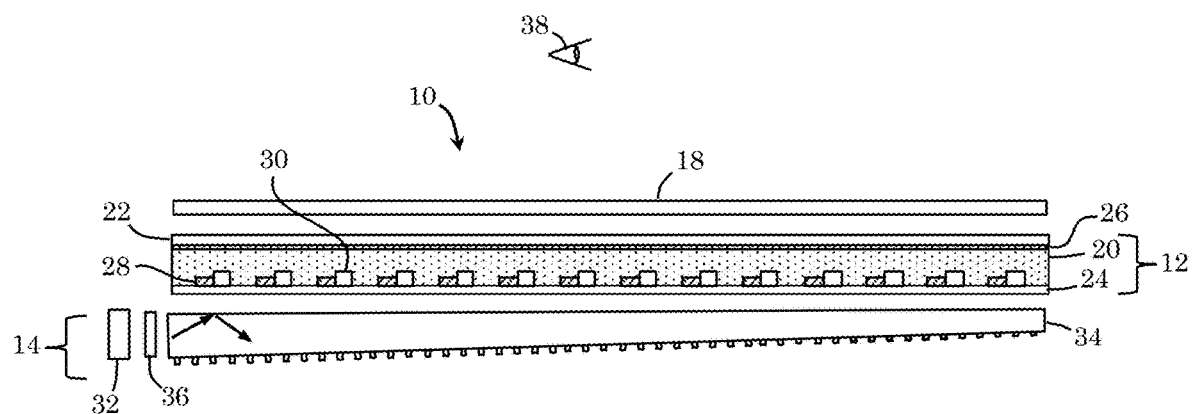
FIG. 1 is a cross-sectional edge view of a single-side-view liquid crystal display device.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example, up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an," and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including," and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the term "transparent" or variations thereof when used in the context of an article of manufacture (e.g., plate, substrate, or other article or portion thereof) means a transmittance of electromagnetic radiation (e.g., light) by the material of the article of equal to or greater than about 50% over 100 millimeters (mm) in a wavelength range from 400 nanometers (nm) to 700 nm when measured by an optical power meter.

FIG. 1 shows a liquid crystal transparent display device 10 configured to display an image. Display device 10 comprises a liquid crystal display panel 12 and a polarized back light unit (BLU) 14. BLU 14 is typically spaced apart from display panel 12 by a gap. Display panel 12 comprises a liquid crystal material 20 sandwiched between a first glass substrate 22 and a second glass substrate 24. Display panel 12 may further comprise a transparent electrode 26, pixel electrodes 28, and thin film transistors 30 to facilitate control of the liquid crystal material at individual pixel locations. Display device 10 may further comprise a polarizer plate 18 positioned over the viewer-facing surface of the display panel.

BLU 14 comprises a light source 32 formed, for example, by one or more light emitting diodes (LEDs), and a light-guide plate (LGP) 34 configured to receive light from light source 32 through at least one edge surface of LGP 34 and distribute that light to a surface of adjacent display panel 12. BLU 14 may further comprise a polarizer 36 positioned between light source 32 and LGP 34 to linearly polarize light from the light source. Light coupled into LGP 34 from the at least one edge surface of the LGP transforms the illumination from the light source, for example a one-dimensional (1D) linear array of LEDs, into a two-dimensional (2D) surface illumination. Light may be extracted from LGP 34 by adding light extractors to one or both surfaces of the LGP that disrupt total internal reflection of the light guided within the LGP. The extracted light is then transmitted through the liquid crystal layer 20 where the light phase is modulated, and subsequently passed through polarizer 18 where the phase modulation is converted into an intensity modulation. The image to be viewed is formed on one side of display panel 12 as indicated by viewer 38. Because the BLU is physically separated from liquid crystal layer 20, this category of liquid crystal display enables large display sizes. However, the separation between the BLU and the display panel can make reductions in display device thickness challenging. Moreover, because of the need for a polarizer plate, the transparency of the display panel can be limited to less than about 50%.

A liquid crystal display device is described herein that enables a two-sided view of a display device, wherein bridge structures are introduced for transparent liquid crystal display devices to couple light from one or more edge-lighted transparent plates to surface-illuminate a display panel. Bridge structures are protrusions extending outward from the transparent plate and extending between the transparent plate and a display panel. Embodiments herein may enable a two-side-view of an image with high brightness uniformity. Such a design may further enable slim, large-size displays. Widths may range, for example, from about 25 millimeters (mm) to about 250 mm and with a length in a range from about 15 mm to about 150 mm. The disclosed edge-lighted transparent liquid crystal displays do not require special light sources, such as polarized light sources, and/or a collimated light source (narrow output angular distribution).

Figure 2:
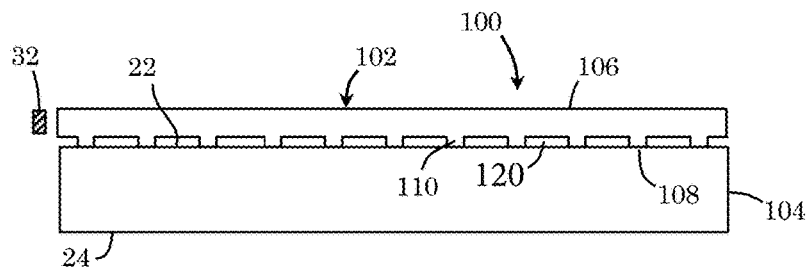
FIG. 2 is a cross-sectional side view of an exemplary two-side view liquid crystal display device according to the present disclosure.

FIG. 2 is a cross-sectional edge view of an exemplary display device 100 comprising a transparent plate 102 attached to and optically coupled to a display panel display panel 104 similar to display panel 12. Display panel 104 comprises first glass substrate 22, second glass substrate 24 as previously described. A liquid crystal layer 20, for example a polymer-dispersed liquid crystal (PDLC) material, is sandwiched between the first and second glass substrates. A typical PDLC material comprises microdroplets of low-molecular-mass nematic liquid crystals dispersed in a polymer film. The polymer film may be, for example, poly(vinyl alcohol), poly(vinyl acetate), or acrylic copolymers. Display panel 104 further comprises a transparent electrode 26 (e.g., indium tin oxide, ITO) disposed on first glass substrate 22, pixel electrodes 28 disposed on second glass substrate 24, and thin film transistors 30 to facilitate control of the liquid crystal material scattering property at individual pixel locations. Light from light source 32, e.g., an array of LEDs, is coupled into transparent plate 102 through an edge surface of transparent plate 102, transforming light from the 1D light source into a 2D surface illumination of display panel 104. However, unlike display device 10 shown in FIG. 1, polarizer 18 is unnecessary and the displayed image is formed by modifying the local light scattering properties of the liquid crystal material at individual pixel locations. In comparison with previous liquid crystal transparent displays, the transparent liquid crystal display of FIG. 2 may have greater transparency (e.g., greater than about 50%) than a display device embodied by, for example, FIG. 1, and enables a two-sided view of a displayed image. As used hereinafter, an edge surface of a transparent plate into which light from the light source 32 is coupled is referred to as a light coupling edge surface.

Since transparent plate 102 functions to distribute light over the adjacent display panel surface, transparent plate 102 functions as a light guide plate. The material of transparent plate 102 is selected to have a refractive index near that of the adjacent liquid crystal display panel substrate, for example within about 10% of the refractive index of the display panel substrates 22 and/or 24. For example, transparent plate 102 may be a glass plate comprising a silicate glass such as a borosilicate glass, an aluminoborosilicate, an alkali aluminoborosilicate glass, an alkali-free aluminoborosilicate glass, or any other suitable silicate glass, although non-silicate glasses are also contemplated provided they fall within the transparency and refractive index constraints described above.

A refractive index of transparent plate 102 may be in a range from about 1.35 to about 1.65 at 590 nm, for example in a range from about 1.36 to about 1.65, in a range from about 1.38 to about 1.65, in a range from about 1.40 to about 1.65, in a range from about 1.45 to about 1.65, in a range from about 1.50 to about 1.65, in a range from about 1.55 to about 1.65, in a range from about 1.60 to about 1.65, in a range from about 1.35 to about 1.6, in a range from about 1.35 to about 1.55, in a range from about 1.35 to about 1.5, in a range from about 1.35 to about 1.45, in a range from about 1.35 to about 1.40, in a range from about 1.35 to about 1.39, in a range from about 1.38 to about 1.38, in a range from about 1.37, or in a range from about 1.35 to about 1.36, including all ranges and subranges therebetween.

Transparent plate 102 comprises a first major surface 106, a second major surface 108 opposite first major surface 106, and a plurality of bridge structures 110 that aid in coupling light from the transparent plate to display panel 104. First major surface 106 and second major surface 108 may be parallel surfaces. First major surface 106 may be a flat surface with no protrusions or depressions (recesses) formed therein. First major surface 106 and second major surface 108 define a maximum thickness Tm therebetween (see FIG. 3) in a range from about 0.1 mm to about 5 mm, for example in a range from about 0.1 mm to about 4 mm, in a range from about 0.1 mm to about 3 mm, in a range from about 0.1 mm to about 2 mm, in a range from about 0.1 mm to about 1 mm, in a range from about 0.1 mm to about 0.5 mm, in a range from about 0.2 mm to about 5 mm, in a range from about 0.3 mm to about 5 mm, in a range from about 0.4 mm to about 5 mm, in a range from about 0.5 mm to about 5 mm, in a range from about 0.6 mm to about 5 mm, in a range from about 0.7 mm to about 5 mm, in a range from about 0.8 mm to about 5 mm, in a range from about 0.9 mm to about 5 mm, in a range from about 1 mm to about 5 mm, in a range from about 2 mm to about 5 mm, in a range from about 2 mm to about 5 mm, in a range from about 3 mm to about 5 mm, or in a range from about 4 mm to about 5 mm, including all ranges and subranges therebetween.

Figure 3:
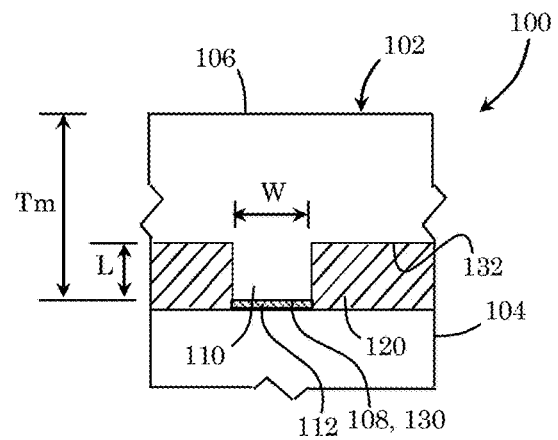
FIG. 3 is a close-up cross-sectional edge view of a portion of the display device of FIG. 2 showing a bridge structure.

As further shown by FIGS. 2-3, bridge structures 110 may be monolithically, e.g., integrally, formed such that bridge structures 110 are continuous with and formed of the same material as the non-bridge structure portions of transparent plate 102. Bridge structures 110 may be etched or molded into transparent plate 102 as shown in FIGS. 2 and 3. For example, transparent plate 102 may be patterned with a resist material and the transparent plate etched (e.g., acid or plasma etched) to produce bridge structures 110. In other embodiments, transparent plate 102 may be patterned using photolithography, then etched. Wet etching or dry etching (e.g., plasma etching) may be used. In some embodiments, the bridge structures may be machined into the transparent plate surface. Transparent plate 102 may be bonded to display panel 104 with an adhesive 112. For example, adhesive 112 may be disposed between transparent plate 102 and display panel 104, such as between distal ends of bridge structures 110 and display panel 104.

Figure 4:
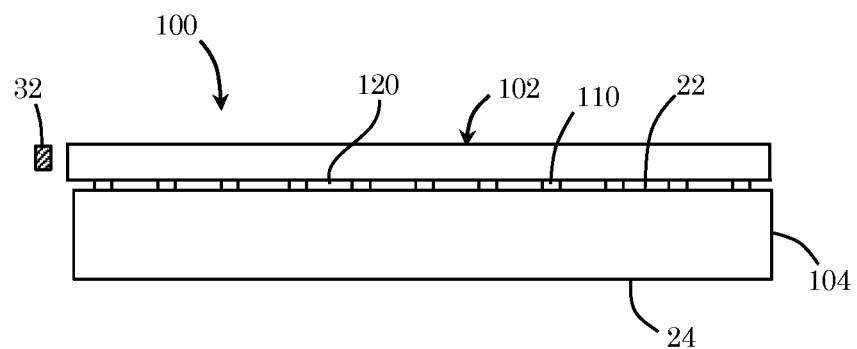
FIG. 4 is a cross-sectional edge view of an exemplary two-side view liquid crystal display device having a bridge structure layer applied to a surface of a transparent plate according to the present disclosure.
Figure 5:
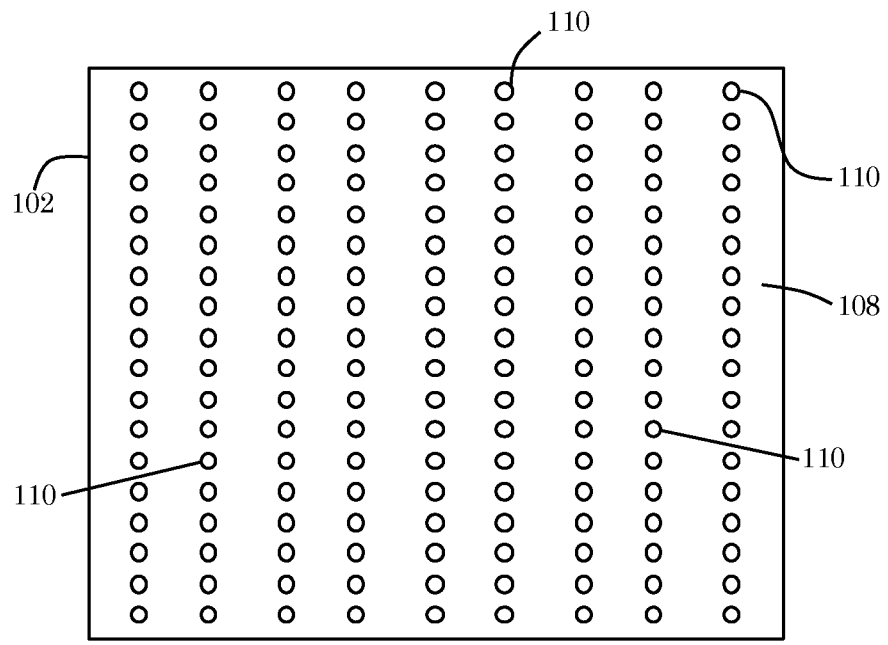
FIG. 5 is a cross-sectional edge view of an exemplary two-side view liquid crystal display device having bridge structures on a surface of a transparent plate according to the present disclosure, the bridge structures comprising discrete members applied to the surface of the transparent plate.
Figure 6:
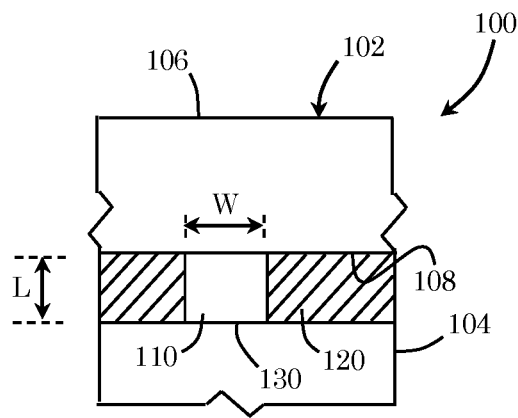
FIG. 6 is a close-up cross-sectional edge view of a portion of the display device of FIG. 5 showing a discrete bridge structure layer applied to a transparent plate.

However, bridge structures 110 may be deposited on a surface of transparent plate 102, for example as discrete bridge structures 110. Accordingly, bridge structures 110 may be formed from a material different from the material of transparent plate 102. FIG. 5 is a top view of a transparent plate 102 showing a plurality of discrete bridge structures 110 deposited on second major surface 108, while FIG. 6 is a close-up cross-sectional view of one such bridge structure. Deposition of bridge structures 110 may be accomplished, for example, by screen printing the transparent bridge structures on a surface of transparent plate 102 (e.g., second major surface 108) as shown in FIGS. 4-6. In another example, bridge structure 110 may be ink jet printed on the surface.

Figure 7:
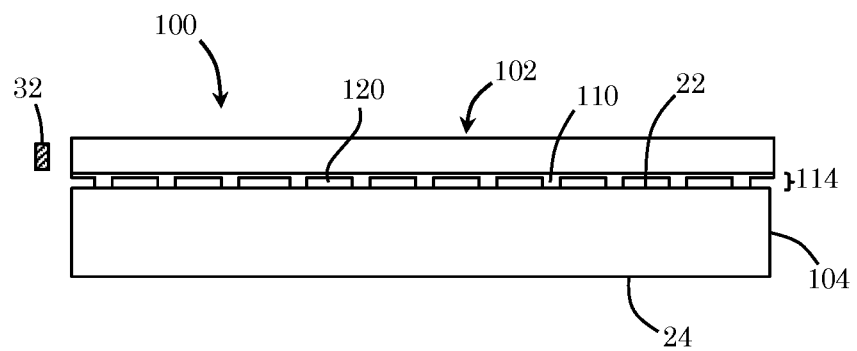
FIG. 7 is a cross-sectional edge view of an exemplary two-side view liquid crystal display device having a bridge structure layer applied to a surface of a transparent plate according to the present disclosure, the bridge structures comprising discrete members applied to the surface of the transparent plate.
Figure 8:
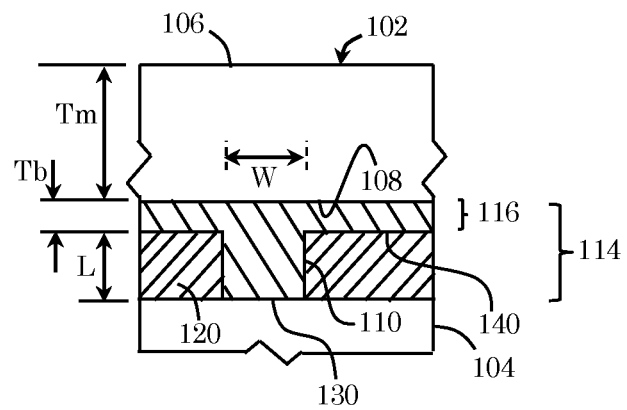
FIG. 8 is a close-up cross-sectional edge view of a portion of the display device of FIG. 5 showing a bridge structure layer applied to the transparent plate, the bridge structure layer comprising a base layer and the bridge structure.

Bridge structures 110 may comprise and be integral with a sheet 114 of material, including a base layer 116 with a thickness Tb and a plurality of bridge structures 110 extending from a surface 118 of base layer 116, as shown in FIGS. 7-8. Sheet 114 may be formed, for example, by microreplication, wherein bridge structures 110 can be embossed into the sheet 114. Sheet 114 may be a polymer material, for example a transparent polymer material.

If bridge structures 110 are formed of a material different from the material of the transparent plate (or the display panel), for example as discrete bridge structures or deposited with sheet 114, the refractive index of the bridge structure material should be near that of the material of the transparent plate (or the display panel substrate), e.g., within 10% of the refractive index of the transparent plate, for example within about 8%, within about 6%, within about 5%, within about 4%, within about 3%, within about 2%, or within about 1%. The material 120 surrounding the bridge structures may be air or another material with a refractive index at least 10% less than the refractive index of the bridge structure material to preserve the light guiding capability of both the transparent plate 102 and the bridge structures 110, for example at least 12% less, at least 14% less, at least 16% less, or at least 20% less. For example, the surrounding material 120 may be a polymer material selected to have an index of refraction at least 10% less than the refractive index of the bridge structure material. The materials of the transparent plate 102, the bridge structures 110, and the material 120 surrounding the bridge structures may be selected to be transparent in the visible wavelengths (i.e., absorption of electromagnetic radiation (e.g., light) by the material of no more than 50% over 100 millimeters (mm) in a wavelength range from 400 nanometers (nm) to 700 nm when measured by an optical power meter from about 350 nm to about 700 nm. As previously indicated, transparent plate 102 may be formed of a glass material.

Figure 9:
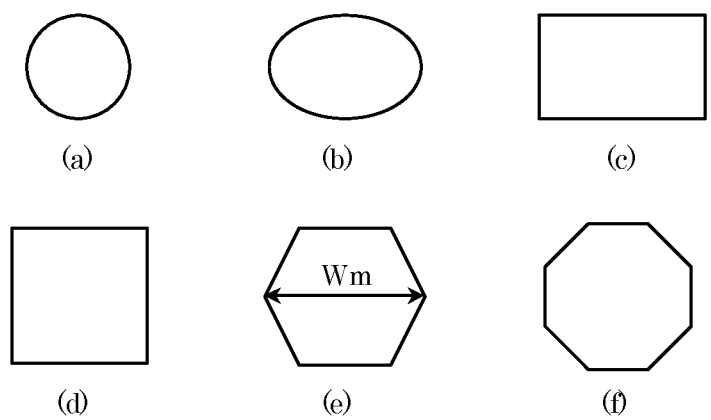
FIG. 9 are top views of example bridge structure cross-sections in a plane parallel to a surface of the transparent plate.

Bridge structures 110 can have a variety of cross-sectional shapes and sizes. FIG. 9 depicts example cross-sectional shapes of bridge structures 110 in a plane parallel with first major surface 106 of transparent plate 102. As examples, bridge structures can have cross-sectional shapes that are circular (a), elliptical or oval (b), or polygonal (e.g., rectangular (c), square (d), hexagonal (e), octagonal (f), etc.). However, individual bridge structures need not have regular geometric cross-sectional shapes but may instead be irregularly shaped.

Each bridge structure disposed between a transparent plate and another article, e.g., a liquid crystal display panel, comprises a length L defined between a reference surface and a distal end 130 of the bridge structure farthest from the reference surface. The reference surface may be a recessed surface 132 of transparent plate 102 if bridge structures 110 are integral with the transparent plate as shown in FIG. 3. If bridge structures 110 are discrete features deposited on transparent plate 102, as shown in FIGS. 5-6, the reference surface is the major surface of the transparent plate from which the discrete bridge structures extend, e.g., second major surface 108. Referring to FIG. 3 depicting a bridge structure 110 integral with the transparent plate, the recessed portion of the transparent plate is the result of a subtractive process. That is, transparent plate material has been removed or displaced, for example either through an etching process, a machining process, an embossing process, or another material displacement process. Accordingly, the length (e.g., height) L of the bridge structure 110 is a portion of the maximum thickness Tm of transparent plate 102. Accordingly, the length L for a bridge structure integral with the transparent plate is determined from the recessed surface 132 of the transparent plate to distal end 130, which corresponds to the second major surface 108 of transparent plate 102.

On the other hand, if the bridge structures are discrete, individual bridge structures deposited on second major surface 108 of the transparent plate, as shown in FIG. 6, the reference surface corresponds to second major surface 108, and the length L of a bridge structure 110 is the distance from the reference surface (second major surface 108) to distal end 130 of the bridge structure farthest from the reference surface.

Still further, if the bridge structure comprises a sheet of material (formed for example by a microreplication process), as shown in FIGS. 7-8, the reference surface is the surface 140 of base layer 116 from which the bridge structure extends, and the length L of the bridge structure is defined between the reference surface 140 of base layer 116 from which the bridge structure extends and distal end 130 of the bridge structure (the end farthest from the reference surface). Accordingly, it can be seen that the definition of the reference surface from which a bridge structure length L is determined depends on the nature of the bridge structure, that is, whether the bridge structure is integral with the transparent plate or is deposited thereon. However, it should also be apparent from the previous examples, that the absolute length L of the bridge structure (relative to a reference surface) may be equivalent for each situation described, the difference being what constitutes the reference surface.

The length L of a bridge structure defined between the reference surface and the distal end of the bridge structure can range from a few micrometers (e.g., about 2 micrometers) to about 200 micrometers. The length L can be, for example, in a range from about 5 μm to about 200 μm, in a range from about 10 μm to about 200 μm, in a range from about 20 μm to about 200 μm, in a range from about 40 μm to about 200 μm, in range from about 60 μm to about 200 μm, in a range from about 80 μm to about 200 μm, in a range from about 2 μm to about 180 μm, in a range from about 2 μm to about 160 μm, in a range from about 2 μm to about 140 μm, in a range from about 2 μm to about 120 μm, in a range from about 2 μm to about 100 μm, in a range from about 2 μm to about 80 μm, in a range from about 2 μm to about 60 μm, in a range from about 2 μm to about 40 μm, in a range from about 2 μm to about 20 μm, in a range from about 2 μm to about 10 μm, or in a range from about 2 μm to about 5 μm, including all ranges and sub-ranges therebetween.

Figure 10:
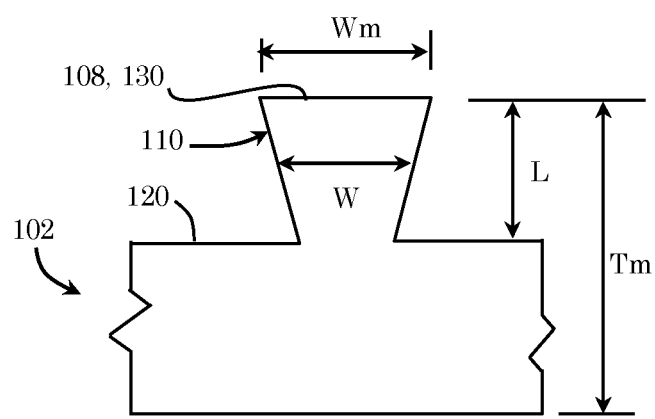
FIG. 10 is a cross-sectional edge view of an exemplary bridge structure wherein a width of the bridge structure varies along the length of the bridge structure.

While FIGS. 3, 6, and 8 illustrate bridge structures with uniform widths (in a single plane orthogonal to first major surface 106 that bifurcates a transparent plate into two halves of equal maximum widths). See, for example, FIG. 9(e)), as shown in FIG. 10 (depicting an integral bridge structure), the width W of each bridge structure may vary along length L of the bridge structure. The maximum cross-sectional width Wm of a bridge structure in a plane parallel to the first major surface 106 of transparent plate 102 can be in a range from about 10 micrometers to about 50 mm, for example in a range from about 10 μm to about 30 mm, in a range from about 10 μm to about 20 mm, in a range from about 10 μm to about 10 mm, in a range from about 10 μm to about 5 mm, in a range from about 10 μm to about 1 mm, in a range from about 10 μm to about 500 μm, in a range from about 10 μm to about 150 μm, in a range from about 10 μm to about 100 μm, in a range from about 10 μm to about 50 μm, in a range from about 10 μm to about 25 μm, in a range from about 20 μm to about 50 mm, in a range from about 40 μm to about 50 mm, in a range from about 60 μm to about 5 mm, in a range from about 80 μm to about 50 mm, in a range from about 100 μm to about 50 mm, in a range from about 200 μm to about 50 mm, in a range from about 250 μm to about 50 mm, in a range from about 500 μm to about 50 mm, in a range from about 1 mm to about 50 mm, in a range from about 5 mm to about 50 mm, or in a range from about 10 mm to about 50 mm, in a range from about 25 mm to about 50 mm, including all ranges and sub-ranges therebetween.

Figure 11:
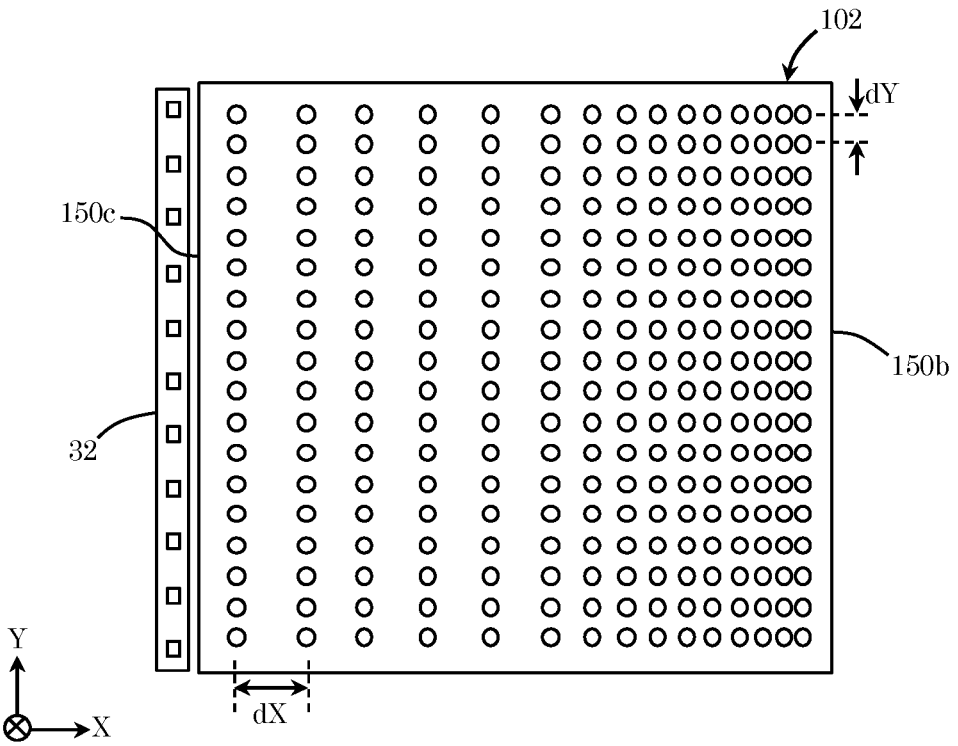
FIG. 11 is a view of an exemplary transparent plate according to the present disclosure showing a pattern of bridge structures on a surface of the transparent plate, and a varying spacing between the bridge structures as a function of distance from a light coupling side edge of the transparent plate.

Referring now to FIG. 11, the distribution of bridge structures 110 may be regular (e.g., aligned, for example, in rows and columns) on a transparent plate 102 as depicted, for example, in FIG. 5, or the bridge structures may be randomly or pseudo-randomly distributed. To provide uniform or substantially uniform illumination of display panel 104, the distribution of bridge structures may vary as a function of distance from the edge in which light is coupled from the light source (the "light coupling edge surface"). For example, as shown in FIG. 11, the spacing dX between adjacent bridge structures in a direction orthogonal to the light coupling edge surface 150a (i.e., in a direction from light coupling edge surface 150a toward edge surface 150b) decreases as the distance from light coupling edge surface 150a increases to compensate for the attenuation in optical power with propagation distance. However, the display device is not limited to a single light source nor a single light coupling edge surface. As used herein, "adjacent bridge structures" refers to two bridge structures spaced apart from one another, with no other bridge structures disposed between the two bridge structures on an axis extending between the two adjacent bridge structures.

Figure 12:
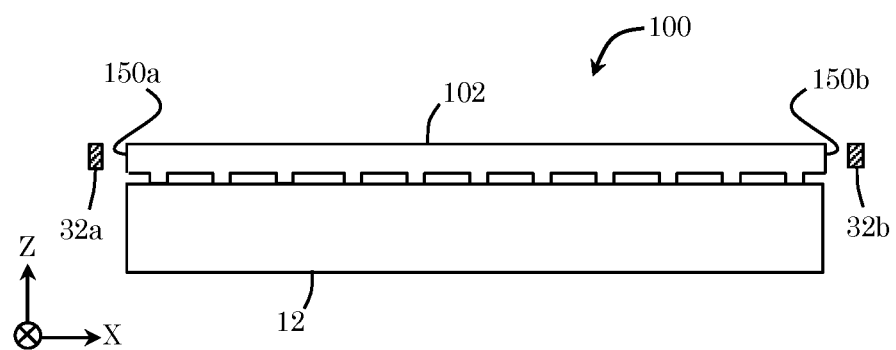
FIG. 12 is a cross-sectional edge view of an exemplary display device comprising a transparent plate with bridge structures lighted by two light sources arranged along two light coupling edge surfaces of the transparent plate.
Figure 13:
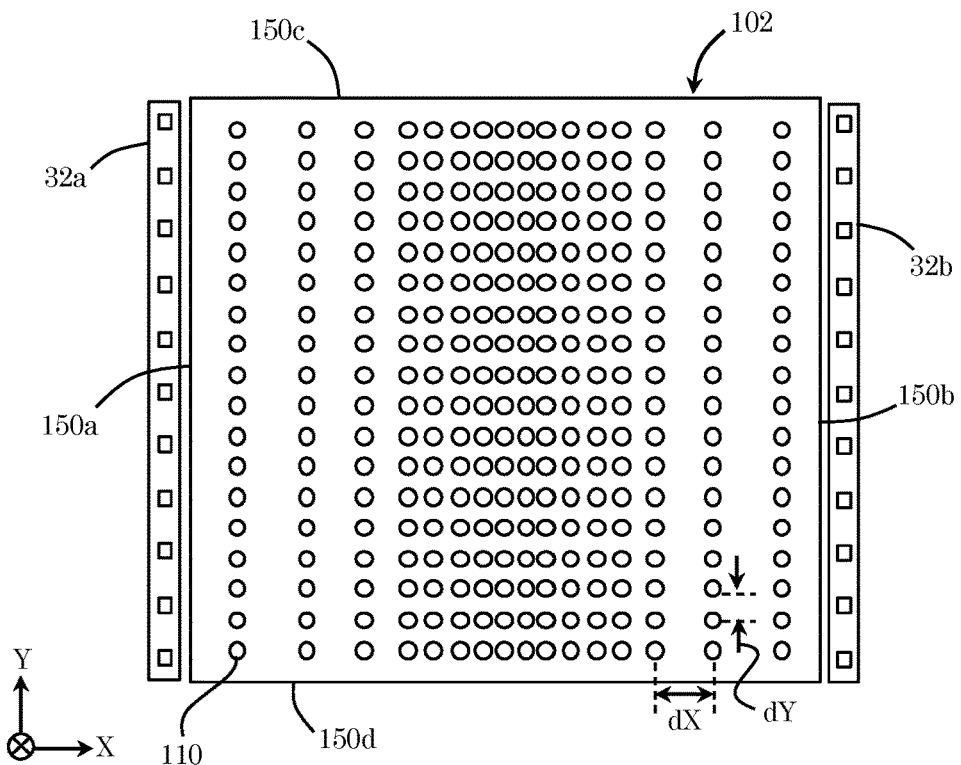
FIG. 13 is a view of an exemplary transparent plate according to the present disclosure showing a pattern of bridge structures on a surface of the transparent plate, and a varying spacing between the bridge structures as a function of distance from two light coupling side edges of the transparent plate.

As an example, FIG. 12 depicts display device 100 comprising two light sources 32, one light source 32a arranged adjacent first light coupling edge surface 150a and a second light source 32b positioned adjacent second light coupling edge surface 150b opposite first light coupling edge surface 150a. As shown in FIG. 13, the spacing dX between adjacent bridge structures of the display device 100 lighted by the two light sources 32a and 32b decreases in a direction from first light coupling edge surface 150a toward second light coupling edge surface 150b. That is, in a direction orthogonal to light coupling edge surface 150a. Additionally, the spacing dX between adjacent bridge structures decreases in a direction from second light coupling edge surface 150b toward first light coupling edge surface 150a. The effect of a decreasing spacing dX between adjacent bridge structures in two opposing directions is that the spacing dX between adjacent bridge structures in the direction from first light coupling edge surface 150a toward second light coupling edge surface 150b first decreases as the distance from light coupling edge surface 150a increases, then increases as the distance from first light coupling edge surface 150a continues to increase. Similarly, the spacing dX between adjacent bridge structures in the direction from second light coupling edge surface 150b toward first light coupling edge surface 150a first decreases as the distance from second light coupling edge surface 150b increases, then increases as the distance from second light coupling edge surface 150b continues to increase. As a result, the spacing dX between adjacent bridge structures is smallest in a central region of the transparent plate (along an axis orthogonal to first and second light coupling edge surfaces 150a, 150b) and increases as the distance from either of the opposing first or second light coupling edge surfaces decreases. The spacing dY between bridge structures in a direction parallel to either one of first or second light coupling edge surfaces 150a or 150b (e.g., along an axis between and orthogonal to third edge surface 150c and edge surface 150d) can remain substantially uniform.

Figure 14:
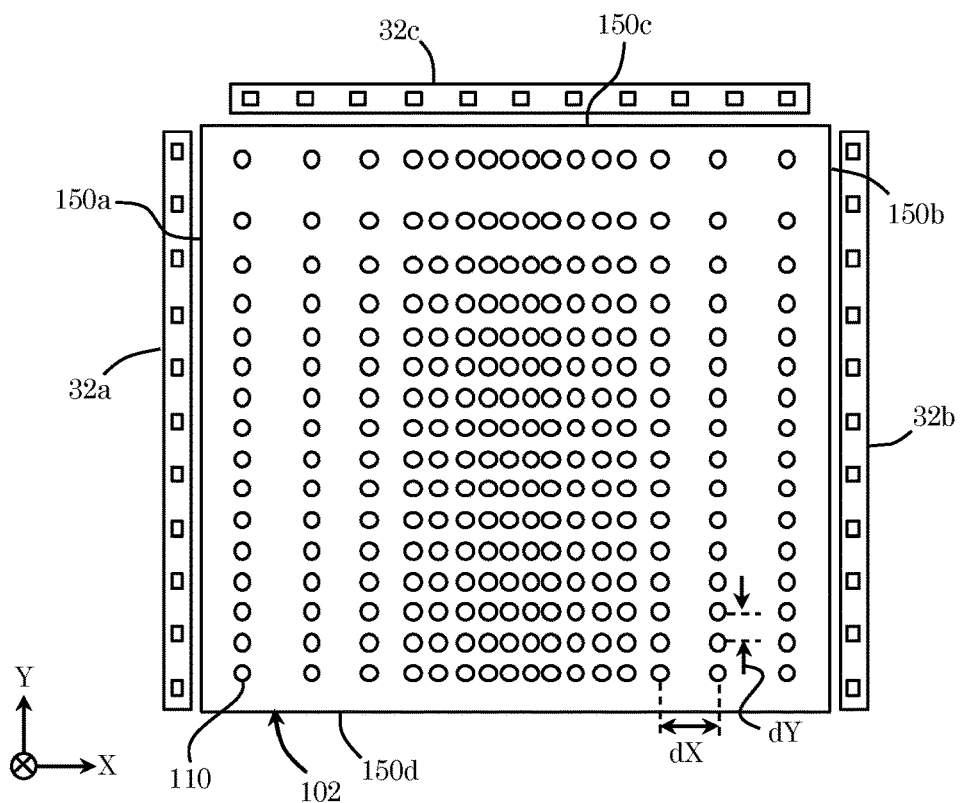
FIG. 14 a view of an exemplary transparent plate according to the present disclosure showing a pattern of bridge structures on a surface of the transparent plate, and a varying spacing between the bridge structures as a function of distance from three light coupling side edges of the transparent plate.

Display device 100 may comprise a single light source 32, two light sources 32, or more than two light sources 32, each light source coupling light into a different light coupling edge surface of the transparent plate. For example, FIG. 14 is a cross-sectional edge view of display device 100 wherein transparent plate 102 is illuminated by three light sources (e.g., three arrays of LEDs), a first light source 32a adjacent first light coupling edge surface 150a, a second light source 32b adjacent second light coupling edge surface 150b, and a third light source 32c adjacent third light coupling edge surface 150c. First light source 32a couples light into first light coupling edge surface 150a, second light source 32b couples light into second light coupling edge surface 150b, and third light source 32c couples light into third light coupling edge surface 150c. First and second light coupling edge surface 150a and 150b may be parallel edge surfaces, whereas third light coupling edge surface may be orthogonal to either one or both of first and second light coupling edge surfaces 150a and 150b. As described above for two light sources coupling light into two parallel light coupling edge surfaces, bridge structures 110 may be arranged such that the spacing dX between adjacent edge surfaces decreases in a direction from first light coupling edge surface 150a toward second light coupling edge surface 150b as the distance from first light coupling edge surface 150a increases, and the spacing dX between bridge structures in a direction from second light coupling edge surface 150b toward first light coupling edge surface 150a may similarly decrease as the distance from second light coupling edge surface 150b increases. As a result, the spacing dX between adjacent edge structures in a central portion of the transparent plate is minimum (along an axis orthogonal to first and second light coupling edge surfaces 150a and 150b), increasing as the distance from the central portion increases (as the distance from the first or second light coupling edge surfaces decreases). As with the instance where a single light source couples light into a light coupling edge surface, the spacing dY between adjacent bridge structures in a direction from third light coupling edge surface 150c (illuminated by third light source 32c) toward fourth edge surface 150d decreases as the distance from third light coupling edge surface 150c increases. The spacing dY between adjacent bridge structures along an axis between third light coupling edge surface 150c and fourth edge surface 150d (e.g., orthogonal to third light coupling edge surface 150c) is a minimum proximate fourth edge surface 150d.

Figure 15:
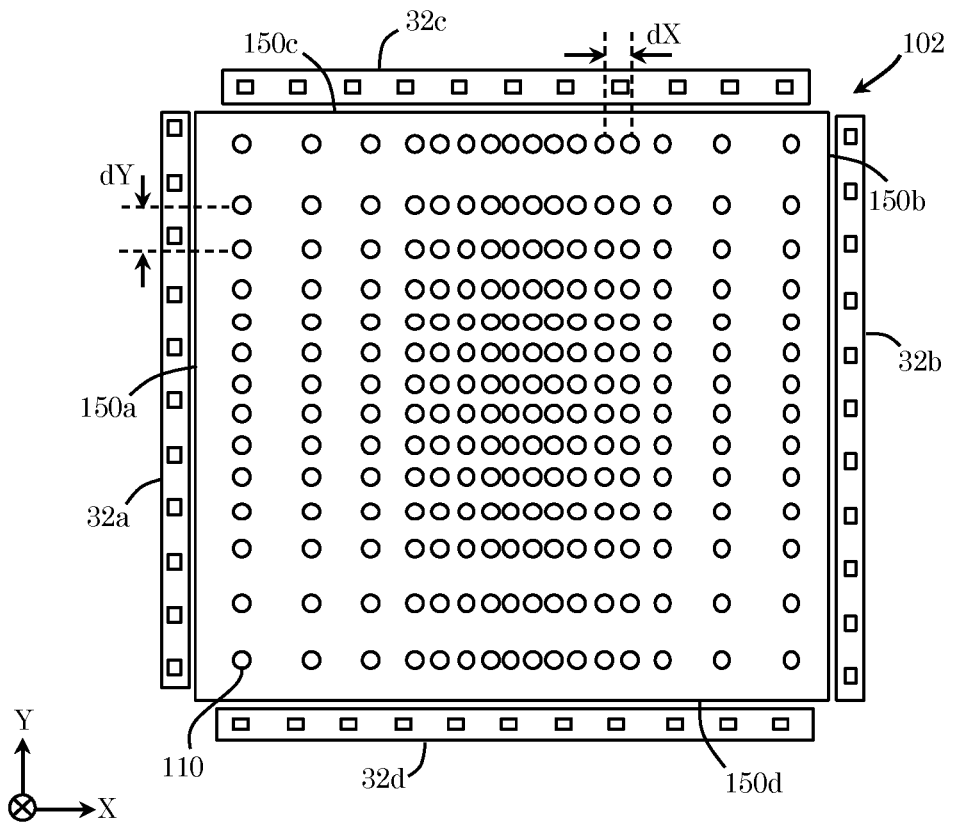
FIG. 15 is a view of an exemplary transparent plate according to the present disclosure showing a pattern of bridge structures on a surface of the transparent plate, and a varying spacing between the bridge structures as a function of distance from four light coupling side edges of the transparent plate.

An instance where light is coupled into transparent plate 102 by four light sources, each light source coupling light into a different edge surface, is shown in FIG. 15. FIG. 15 depicts transparent plate 102 comprising four light coupling edge surfaces 150a-150d and four light sources 32a-32d individually coupling light into the four light coupling edge surfaces, respectively. That is, first light source 32a couples light into first light coupling edge surface 150a, second light source 32b couples light into second light coupling edge surface 150b, third light source 32c couples light into third light coupling edge surface 150c, and fourth light source 32d couples light into fourth light coupling edge surface 150d. The spacing dX between adjacent bridge structures in a direction from first light coupling edge surface 150a toward second light coupling edge surface 150b decreases as the distance from first light coupling edge surface 150a increases. The spacing dX between adjacent bridge structures decreases in a direction from second light coupling edge surface 150b toward first light coupling edge surface 150a. Accordingly, along an axis from first light coupling edge surface 150a and second light coupling edge surface 150b and orthogonal to first and second light coupling edge surfaces 150a and 150b, the spacing dX between adjacent bridge structures is a minimum in a central region of transparent plate 102 and a maximum proximate the first and second light coupling edge surfaces. To wit, the spacing dX between adjacent bridge structures in a direction from first light coupling edge surface 150a toward second light coupling edge surface 150b decreases as the distance from first light coupling edge surface 150a increases, then increases as the distance from first light coupling edge surface 150a continues to increase. Similarly, the spacing dX between adjacent bridge structures in a direction from second light coupling edge surface 150b toward first light coupling edge surface 150a decreases as the distance from second light coupling edge surface 150a increases, then increases as the distance from second light coupling edge surface 150b continues to increase.

In a similar manner, the spacing dY between adjacent bridge structures in a direction from third light coupling edge surface 150c toward fourth light coupling edge surface 150d along an axis orthogonal to third and fourth light coupling edge surfaces 150c and 150d decreases as the distance from third light coupling edge surface 150a increases. Further, the spacing dY between adjacent bridge structures decreases in a direction from fourth light coupling edge surface 150d toward third light coupling edge surface 150c along the axis orthogonal to third light coupling edge surface 150c and fourth light coupling edge surface 150d. Accordingly, along the axis between third light coupling edge surface 150c and fourth light coupling edge surface 150d and orthogonal to the third and the fourth light coupling edge surfaces 150c and 150d, the spacing dY between adjacent bridge structures is a minimum in a central region of transparent plate 102 and a maximum proximate the third and fourth light coupling edge surfaces. To wit, the spacing dY between adjacent bridge structures in a direction from third light coupling edge surface 150c toward fourth light coupling edge surface 150d decreases as the distance from third light coupling edge surface 150c increases, then increases as the distance from third light coupling edge surface 150c continues to increase. Similarly, the spacing dY between adjacent bridge structures in a direction from fourth light coupling edge surface 150d toward third light coupling edge surface 150c decreases as the distance from fourth light coupling edge surface 150d increases, then increases as the distance from fourth light coupling edge surface 150d continues to increase. As illustrated in FIG. 15, the spacing between adjacent bridge structures with four light sources and four light coupling edge surfaces (for a rectangular transparent plate) is a minimum in a central region of the transparent plate and a maximum in peripheral regions of the transparent plate, e.g., as a distance from any one of the light coupling edge surfaces decreases.

Figure 16:
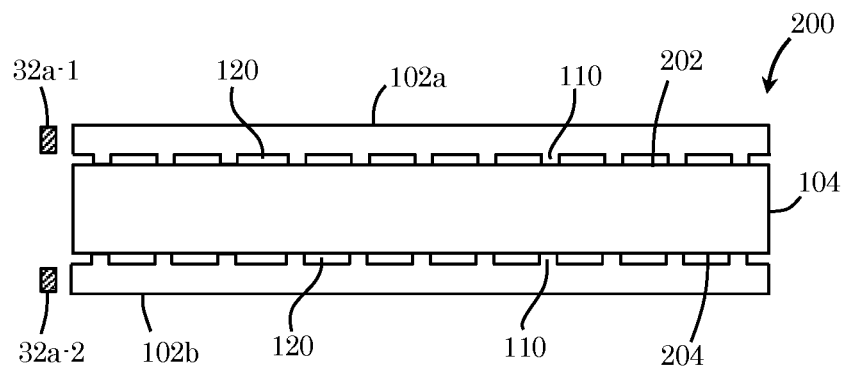
FIG. 16 is a cross-sectional edge view of an exemplary display device comprising two transparent plates attached to a display panel, each transparent plate lighted by a light source, the light sources arranged along corresponding light coupling edge surfaces of the transparent plates.

Display devices in accordance with the present disclosure may comprise more than one transparent plate 102. For example, a display device 200 is illustrated in FIG. 16 comprising two transparent plates attached thereto, a first transparent plate 102a attached to a first major surface 202 of display panel 104 (e.g., glass substrate 22), and a second transparent plate 102b opposite first transparent plate 102a and attached to a second major surface 204 of display panel 104 (e.g., glass substrate 24). Either one or both of first transparent plate 102a or second transparent plate 102b can be configured as described above in respect of FIGS. 3-15, including the pattern (e.g., spacing) of bridge structures in relation to the distance from each light coupling edge surface.

FIG. 16 is a cross-sectional edge view of display device 200 comprising a first light source 32a-1 adjacent a first light coupling edge surface 150a-1 of first transparent plate 102a and a second light source 32a-2 adjacent a second light coupling edge surface 150a-2 of second transparent plate 102b. Each transparent plate 102a, 102b comprises a plurality of bridge structures as previously described, wherein a spacing between adjacent bridge structures decreases as the distance of the bridge structures from the respective light coupling edge surface increases, for example as described in respect of FIG. 11. In the embodiment depicted in FIG. 16, the light coupling edge surfaces 150a-1, 150a-2 of each transparent plate 102a, 102b, respectively, are positioned such that light from the respective light sources initially propagates in the same direction. That is, the light sources are positioned adjacent corresponding edge surfaces of their respective transparent plates, i.e., on the same side thereof. In the illustrated embodiment, the spacing between adjacent bridge structures decreases as a function of the distance from the light coupling edge surfaces in the same direction for both transparent plates. That is, the spacing between adjacent bridge structures decreases as a function of the distance from the light coupling edge surface of transparent plate 102*a* in a first direction and the spacing between adjacent bridge structures decreases a function of the distance from the light coupling edge surface of second transparent plate 102*b* in the same first direction. However, it should be apparent that the light coupling edge surface of second transparent plate 102*b* could be oriented orthogonal to the light coupling edge surface of transparent plate 102*a* so that the spacing between adjacent bridge structures decreases as a function of the distance from the light coupling edge structures in a first direction for the first transparent plate and the spacing between adjacent bridge structures decreases a function of the distance from the light coupling edge structures in a second direction orthogonal to the first direction for the second transparent plate.

Figure 17:
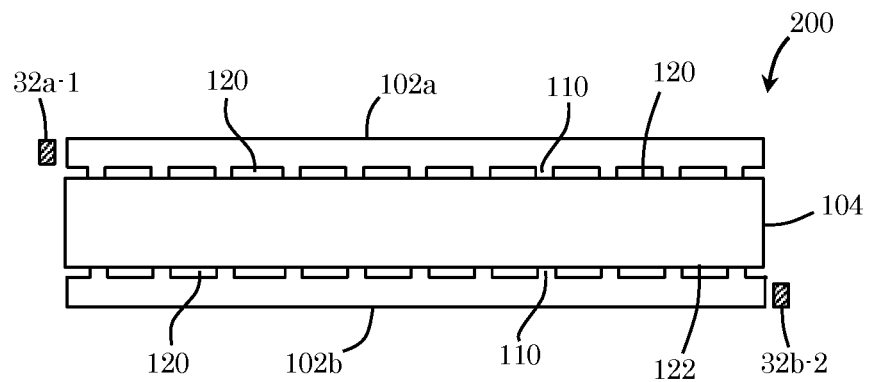
FIG. 17 is a cross-sectional edge view of an exemplary display device comprising two transparent plates attached to a display panel, each transparent plate lighted by a light source, the light sources arranged along opposing light coupling edge surfaces of the transparent plates.

Conversely, FIG. 17 is a cross-sectional edge view of display device 200 comprising a first light source 32*a*-1 adjacent first light coupling edge surface 150*a*-1 of first transparent plate 102*a* that couples light into the first transparent plate 102*a* in a first direction, and a second light source 32*b*-2 that couples light into the second transparent plate 102*b* in a second direction opposite the first direction. Each transparent plate 102*a*, 102*b* comprises a plurality of bridge structures, wherein a spacing between adjacent bridge structures decreases as the distance of the bridge structures from the respective light coupling edge surfaces increases, as described in respect of FIG. 11. More specifically, the spacing between adjacent bridge structures decreases as a function of distance from the light coupling edge surface of first transparent plate 102*a* in a first direction and the spacing between adjacent bridge structures decreases as a function of distance from the light coupling edge surface of second transparent plate 102*b* in a second direction opposite to the first direction.

Figure 18:
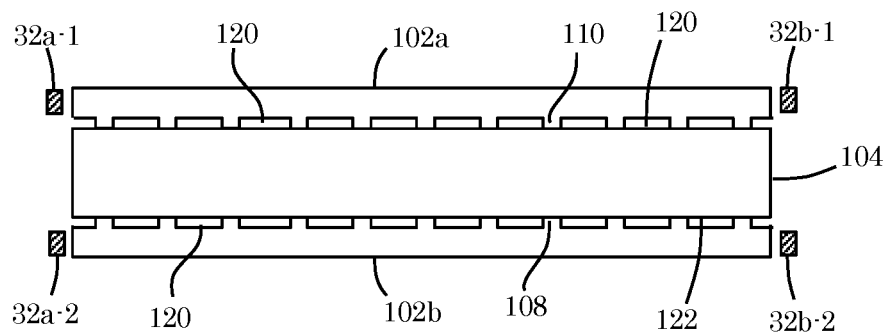
FIG. 18 is a cross-sectional edge view of an exemplary display device comprising two transparent plates attached to a display panel, each transparent plate lighted by two opposing light sources, the light sources arranged along corresponding light coupling edge surfaces of the transparent plates.

FIG. 18 is a cross-sectional edge view of display device 200 comprising a first light source 32*a*-1 adjacent a first light coupling edge surface 150*a*-1 of first transparent plate 102*a* that couples light into the first transparent plate 102*a* in a first direction, and a second light source 32*b*-1 that couples light into the first transparent plate 102*a* in a second direction opposite the first direction. Thus, first transparent plate 102*a* is lighted as described in respect of FIG. 13. That is, in respect of first transparent plate 102*a*, the spacing between adjacent bridge structures decreases as a function of distance from the first light coupling edge surface of first transparent plate 102*a* in a first direction and the spacing between adjacent bridge structures decreases as a function of distance from the second light coupling edge surface of first transparent plate 102*a* opposite the first light coupling edge surface in a second direction opposite the first direction. Display device 200 further comprises a third light source 32*a*-2 adjacent a third light coupling edge surface 150*a*-2 of second transparent plate 102*b* that couples light into the second transparent plate 102*b* in the first direction, and a fourth light source 32*b*-2 that couples light into fourth light coupling edge surface 150*b*-2 of second transparent plate 102*b* in the second direction opposite the first direction. To wit, each of first transparent plate 102*a* and second transparent plate 102*b* are identically lighted. Additionally, each transparent plate 102*a*, 102*b* comprises a plurality of bridge structures 110, wherein a spacing between adjacent bridge structures decreases as the distance of the bridge structures from the respective light coupling edge surface increases, as described in respect of FIG. 13. In further embodiments, each transparent plate 102*a*, 102*b* may additionally comprise additional light coupling edge surfaces such that light from additional light sources is coupled into the additional light coupling edge surfaces. For example, each transparent plate 102*a* and 102*b* may be lighted as described in respect of FIG. 14 or FIG. 15.

It should be apparent from the foregoing description that many combinations of light sources arranged adjacent to light coupling edge surfaces of one or two transparent plates of a display device are contemplated. That is, a display device contemplated herein may comprise one or two transparent plates, the one or two transparent plates arranged adjacent a respective major surface of the display panel. Each transparent plate may include one or more light sources, each light source arranged adjacent a light coupling edge surface of the respective transparent plate. Each transparent plate may comprise one or more light coupling surfaces wherein a light source is positioned adjacent each light coupling edge surface. For example, there may be one, two, three, four light sources, or more light sources associated with each transparent plate of the display device, each light source positioned adjacent an individual light coupling edge surface of the respective transparent plate (see, for example, FIGS. 11, 13, 14, 15 and the descriptions therefor). Each light source may comprise a plurality of light emitting devices, for example a plurality of LEDs arranged in a linear array. Moreover, it should be further apparent that the orientation of the second transparent plate 102*b* including the light sources arranged adjacent light coupling surfaces of the second transparent plate may be different from the orientation of the first transparent plate and the light sources adjacent the light coupling edge surfaces of the first transparent plate. That is, the light sources adjacent the light coupling edge surfaces of the second transparent plate 102*b* need not be positioned identically to the light sources adjacent the light coupling edge surfaces of the first transparent plate 102*a*.

Figure 19:
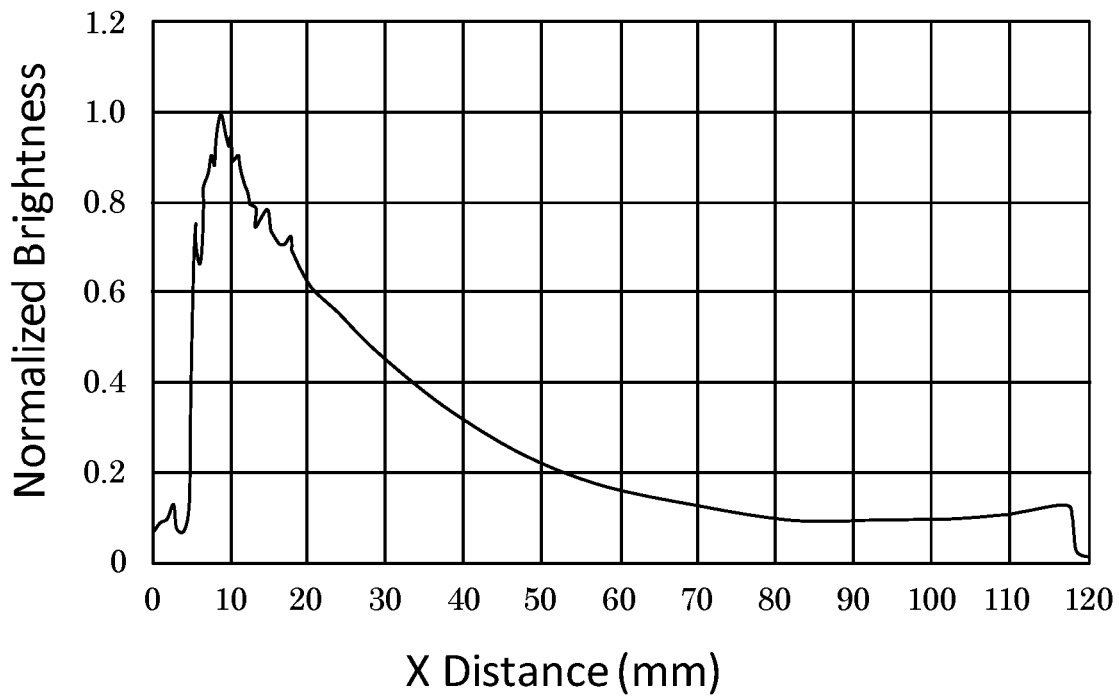
FIG. 19 is a graph of normalized brightness from a display device of FIG. 20, the graph illustrating brightness uniformity across a dimension of the display device display panel orthogonal to the light coupling edge surface.
Figure 20:
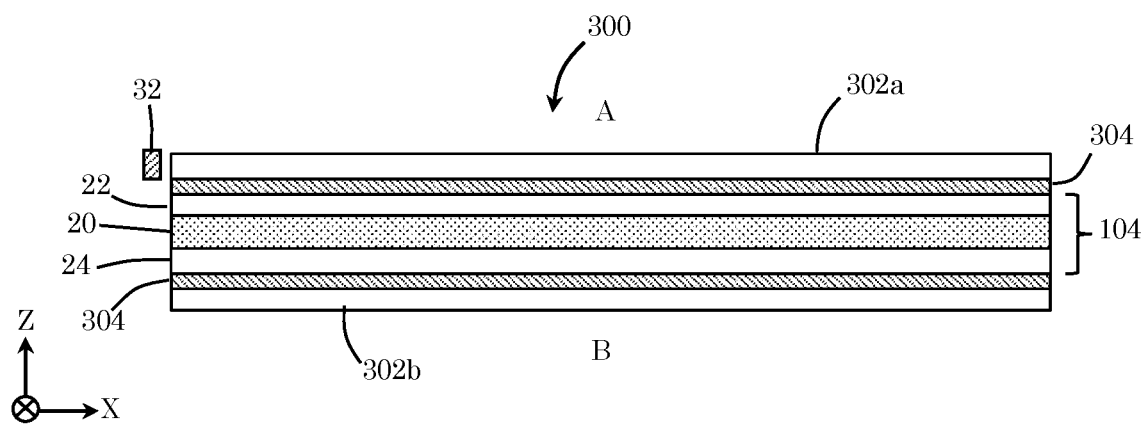
FIG. 20 is a cross-sectional edge view of an exemplary display device forming the basis of modeling for a two-side-view display device without bridge structures.

FIG. 19 is a graph showing normalized measured brightness as a function of distance from the light coupling edge surface for the display device 300 shown in FIG. 20 with the display panel exhibiting a white screen (e.g., light output but no image). Display device 300 comprised a display panel 104 including a liquid crystal layer disposed between two glass substrates 22, 24, a first transparent plate 302*a* attached to a first (A) side of display panel 104 (e.g., glass substrate 22) and a second transparent plate 302*b* attached to a second (B) side of display panel 104 (e.g., glass substrate 24) opposite the first side. First transparent plate 302*a* and second transparent plate 302*b* were attached to the respective sides of display panel 104 by adhesive layers 304 (an OCA layer). A light source 32 having a Lambertian output was positioned adjacent a light coupling edge surface of first transparent plate 302*a*. Neither transparent plate 302*a* nor 302*b* included bridge structures. A thickness of transparent plates 302*a*, 302*b* was 0.7 mm, with a refractive index of 1.50 at 550 nm. The liquid crystal material had a thickness of 0.05 mm and a refractive index of 1.60. The adhesive 304 had a thickness of 0.125 mm and a refractive index of 1.48 at 550 nm. The display panel had width and length dimensions of 40 mm and 120 mm, respectively. The data show the brightness uniformity of display device 300 is extremely poor, only approximately 5%.

Figure 21:
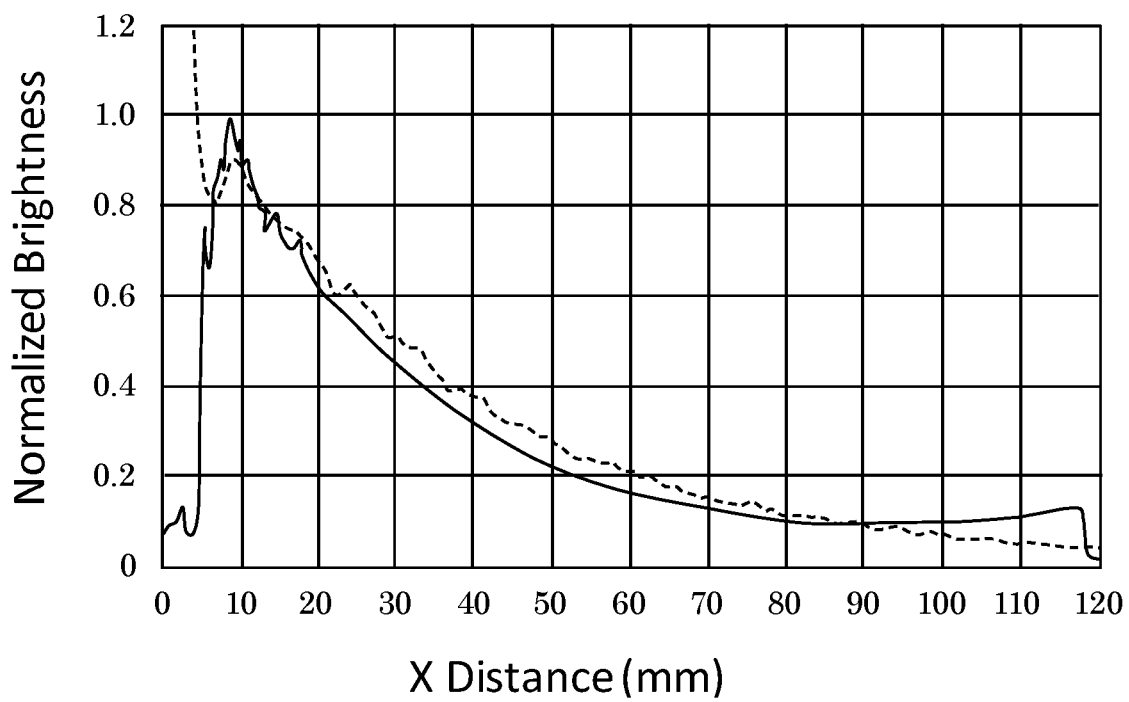
FIG. 21 is a graph of measured and normalized brightness from the display device of FIG. 20 and a modeled brightness of an equivalent display device, as a function of distance along an X-axis, the graph illustrating good agreement between the measured brightness and the modeled brightness across the X-dimension of the display device display panel orthogonal to the light coupling edge surface.

The brightness of display device 300 was also modeled. FIG. 21 is a graph showing the data of FIG. 19 with modeled results added (dashed line). The data show good agreement between the experimental (measured) results and the modeled results.

Figure 22:
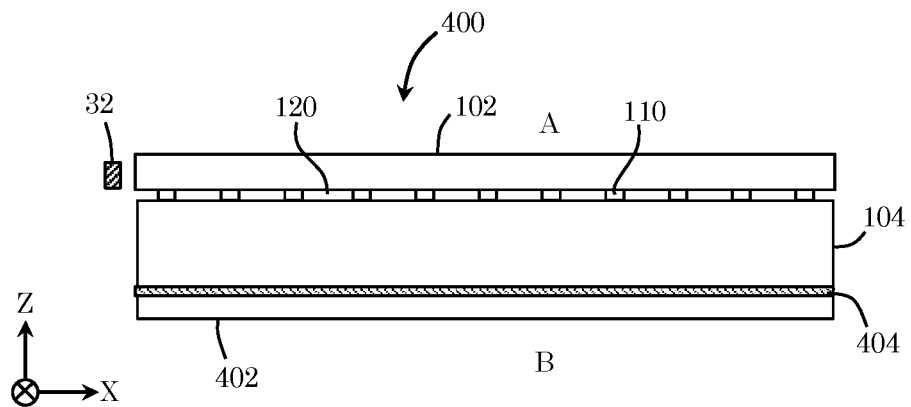
FIG. 22 is a cross-sectional edge view of an exemplary display device comprising a display panel with a first transparent plate including bridge structures and a second transparent plate without bridge structures.

Another display device 400, depicted in FIG. 22, was modeled. Display device 400 comprised a display panel 104 including a liquid crystal layer disposed between two glass substrates 22, 24 (see FIG. 1), a first transparent plate 102 attached to a first surface of display panel 104 on a first (A) side of the display panel (e.g., glass substrate 22) by a plurality of bridge structures 110 formed from an optically clear adhesive, a second transparent plate 402 attached to a second (B) side of display panel 12 (e.g., glass substrate 24) by a second layer 404 of the optically clear adhesive but without bridge structures, and a light source 32 positioned adjacent a light coupling edge surface of first transparent plate 102. Light source 32 comprised a plurality of LEDs, each LED having a Lambertian output, and was positioned to light a light coupling edge surface of first transparent plate 102. A thickness of transparent plates 102 and 402 was 0.7 mm. A refractive index of transparent plates 102 and 402 was 1.50 at 550 nm. The liquid crystal material had a thickness of 0.05 mm and a refractive index of 1.60. The optically clear adhesive layer 404 attaching second transparent plate 402 to display panel 12 (i.e., second glass substrate 24) had a thickness of 0.125 mm and a refractive index of 1.48 at 550 nm. The display panel had width and length dimensions of 40 mm and 120 mm, respectively.

Figure 23:
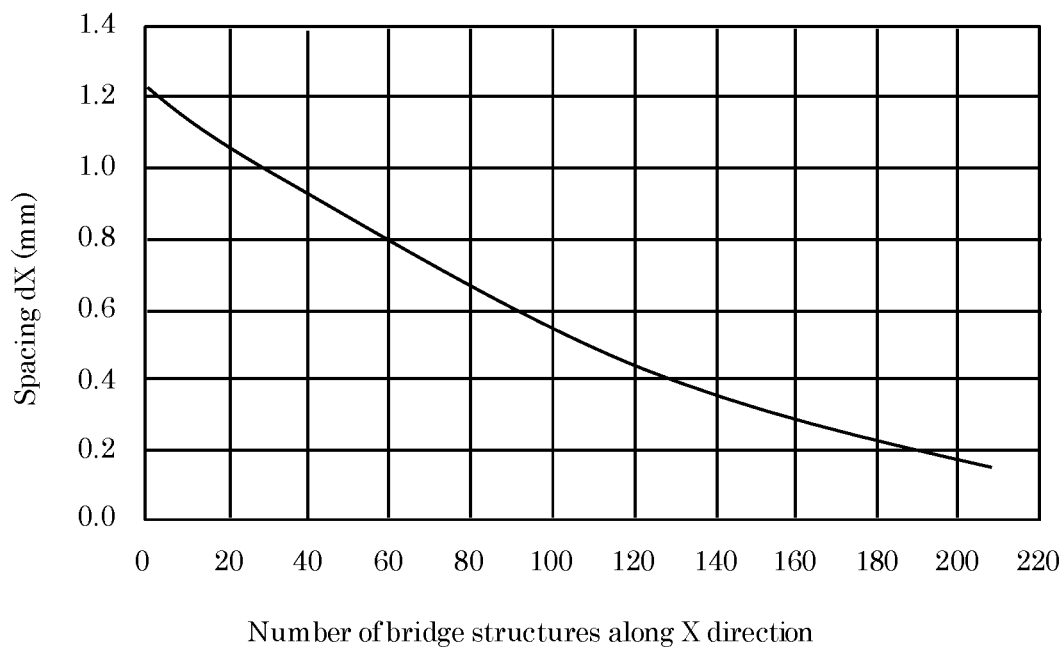
FIG. 23 is a graph illustrating the spacing between individual bridge structures along the indicated X-axis orthogonal to the light coupling edge surface for the display device of FIG. 22 as a function of the number of bridge structures along the indicated X-axis.

The bridge structures of transparent plate 102 of display device 400 had a spacing between adjacent bridge structures that decreased as a function of distance from the light source (i.e., from the light coupling edge surface) in a first direction, as depicted in FIG. 8. The spacing between adjacent bridge structures in a direction orthogonal to the first direction was uniform. The bridge structures had circular cross-sectional shapes with a radius of 50 micrometers (μm) and a height of 50 μm and the material 120 surrounding the bridge structures was air. FIG. 23 shows the spacing dX between adjacent bridge structures as a function of the cumulative number of bridge structures counted from the light coupling edge surface in a direction to the opposite edge surface.

Figure 24:
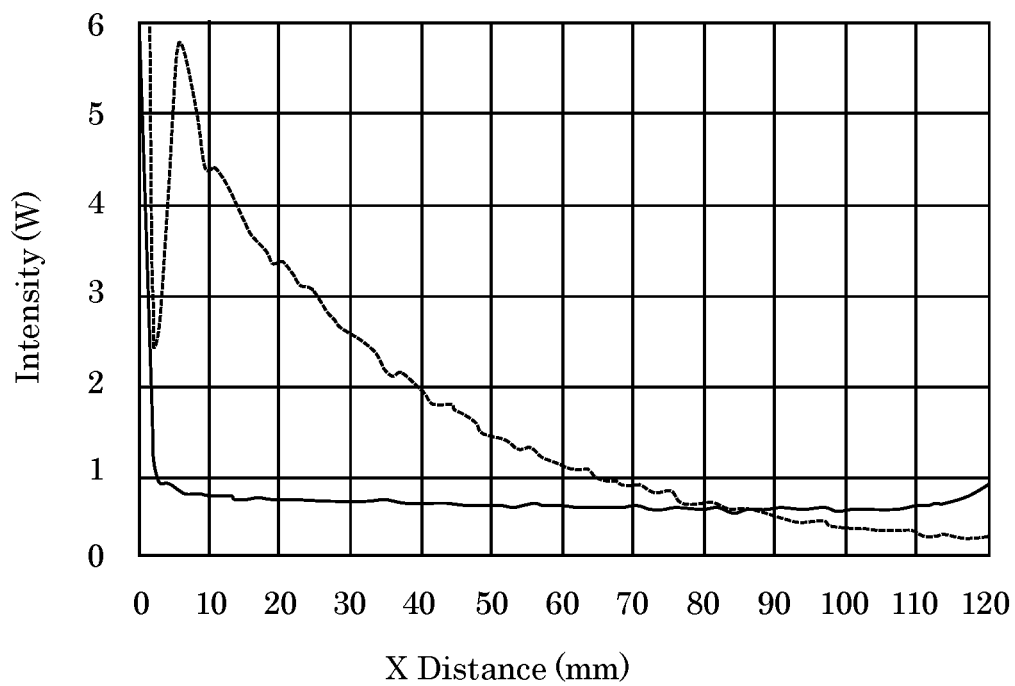
FIG. 24 is a graph of light intensity at a first image surface of the display device of FIG. 22 compared to the light intensity at the image surface of the display device of FIG. 20 as a function of distance along the X-axis.
Figure 25:
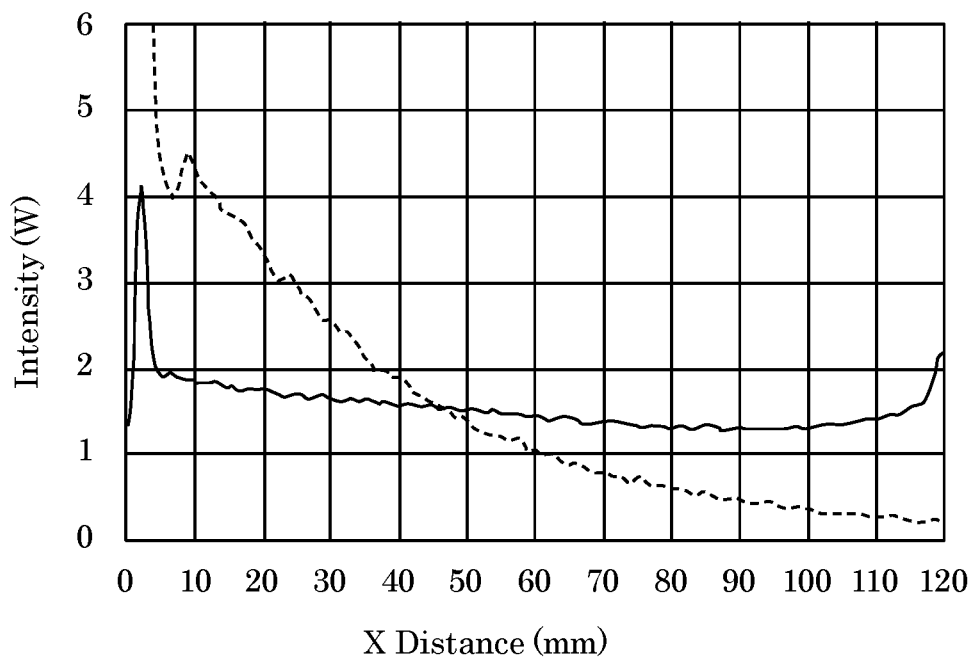
FIG. 25 is a graph of light intensity at a second image surface of the display device of FIG. 22 compared to the light intensity at the image surface of the display device of FIG. 20 as a function of distance along the X-axis.
Figure 26:
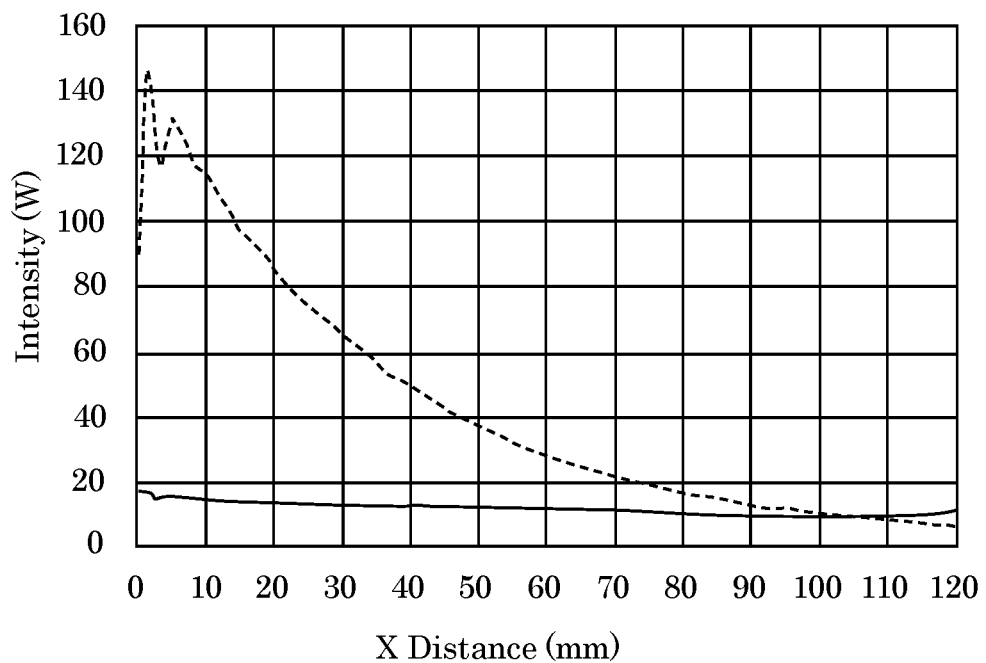
FIG. 26 is a graph of light intensity at a center of the liquid crystal material in the display device of FIG. 22 compared to the light intensity at the image surface of the display device of FIG. 20 as a function of distance along the X-axis.

FIG. 24 shows brightness in watts as a function of distance from the light coupling edge surface for display device 400 viewed from the side facing the transparent plate 102 (side A) compared to display device 300 side A (dashed line) when the display devices were assumed to display a white screen (lighted but not displaying an image). FIG. 25 shows brightness in watts as a function of distance from the light coupling edge surface for display device 400 viewed from the side facing the transparent plate 402 (side B) compared to display device 300 side B (dashed line). FIG. 26 shows brightness in watts as a function of distance from the light coupling edge surface for display device 400 compared to display device 300 (dashed line) at the center of the thickness of the liquid crystal material. The data show that while the average brightness (or center brightness) of display device 400 with bridge structures on the A side and the B side is similar to the display device 300 without bridge structures, the brightness uniformity of display device 400 with bridge structures is significantly greater than for display device 300 without bridge structures.

The following table presents brightness uniformity data on sides A, B, and the center of the liquid crystal (LC) layer for display devices 300 and 400. The data show significantly improved brightness when a transparent plate comprising a plurality of bridge structures is utilized in a display device.

| Display Device | Brightness Uniformity (%) in X direction between 10 mm and 115 mm) | | |
|---|---|---|---|
| | Side A | Side B | LC Layer |
| Display Device 300 | 5 | 6 | 6 |
| Display Device 400 | 76 | 70 | 68 |

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. In combination, a display panel and a light coupling device for coupling light from a light source to the display panel,
the light coupling device comprising:
a transparent plate comprising a first major surface and a second major surface opposite the first major surface, the transparent plate further comprising a plurality of edge surfaces connecting the first major surface and the second major surface; and
a plurality of bridge structures positioned proximate the second major surface, each bridge structure comprising a length (L) in a range from about 2 micrometers to about 200 micrometers defined between a reference surface from which the plurality of bridge structures extend and a distal end of the bridge structure farthest from the reference surface, and
the display panel comprising a first surface engaging the distal end of the plurality of bridge structures wherein an image on the display panel is viewable from the first surface and an opposite second surface of the display panel.

2. The combination of claim 1, wherein the plurality of edge surfaces comprises a first edge surface and a second edge surface opposite the first edge surface, the plurality of bridge structures comprises a first set of bridge structures positioned along a first axis extending between the first edge surface and the second edge surface, and a distance separating adjacent bridge structures of the first set of bridge structures along the first axis decreases in a direction from the first edge surface toward the second edge surface.

3. The combination of claim 2, wherein the plurality of bridge structures comprises a second set of bridge structures positioned along the first axis, and a distance separating adjacent bridge structures of the second set of bridge structures decreases in a direction from the second edge surface toward the first edge surface.

4. The combination of claim 3, wherein the plurality of edge surfaces comprises a third edge surface and a fourth edge surface opposite the third edge surface and the plurality of bridge structures comprises a third set of bridge structures positioned along a second axis extending between the third edge surface and the fourth edge surface, and a distance separating adjacent bridge structures of the third set of bridge structures decreases in a direction from the third edge surface toward the fourth edge surface.

5. The combination of claim 4, wherein the plurality of bridge structures comprises a fourth set of bridge structures positioned along the second axis, and a distance separating adjacent bridge structures of the fourth set of bridge structures decreases in a direction from the fourth edge surface toward the third edge surface.

6. The combination of claim 5, wherein the first edge surface is orthogonal to the third edge surface.

7. The combination of claim 1, wherein a cross-sectional shape of a bridge structure of the plurality of bridge structures in a plane parallel with the first major surface comprises a circle, an ellipse, or a polygon.

8. The combination of claim 1, wherein a maximum width of each bridge structure in a plane parallel with the first major surface is in a range from about 10 micrometers to about 50 millimeters.

9. The combination of claim 8, wherein the maximum width varies along the length of each bridge structure.

10. The combination of claim 9, wherein the maximum width is greater at the distal end than at the reference surface.

11. The combination of claim 1, wherein the plurality of bridge structures comprise an optically clear adhesive.

12. The combination of claim 11, wherein the optically clear adhesive comprises a coating layer disposed on the second major surface of the transparent plate.

13. The combination of claim 1, wherein the reference surface is the second major surface of the transparent plate.

14. The combination of claim 1, wherein the reference surface is a surface of the transparent plate recessed from the second major surface.

15. The combination of claim 12, wherein the reference surface comprises a recessed surface of the coating layer.

16. The combination of claim 1, wherein a maximum thickness of the transparent plate is in a range from about 0.1 mm to about 5 mm.

17. The combination of claim 1, wherein a refractive index of the transparent plate is in a range from about 1.35 to about 1.65.

18. The combination of claim 1, wherein the second major surface of the transparent plate is physically connected to a surface of a glass substrate attached to the plurality of bridge structures.

19. The combination of claim 1, wherein the plurality of bridge structures are disposed in a matrix material and a refractive index of the matrix material is at least about 10% less than a refractive index of the bridge structures.

20. The combination of claim 1, wherein a refractive index of the bridge structures is no more than about 10% different than a refractive index of the transparent plate.

* * * * *